(12) United States Patent
Chen

(10) Patent No.: US 7,562,915 B2
(45) Date of Patent: Jul. 21, 2009

(54) FASTENING MECHANISM

(75) Inventor: Wei-Shih Chen, Taipei (TW)

(73) Assignee: Inventec Corporation, Taipei (TW)

( * ) Notice: Subject to any disclaimer, the term of this patent is extended or adjusted under 35 U.S.C. 154(b) by 292 days.

(21) Appl. No.: 11/607,548

(22) Filed: Nov. 30, 2006

(65) Prior Publication Data

US 2008/0128570 A1 Jun. 5, 2008

(51) Int. Cl.
*E05C 3/04* (2006.01)
*E05C 19/06* (2006.01)

(52) U.S. Cl. ............................ 292/209; 292/80; 292/85; 292/89; 292/303; 292/DIG. 11; 292/DIG. 63; 248/694; 312/111; 312/140; 312/263

(58) Field of Classification Search .................. 292/80, 292/81, 84, 85, 87, 89, 209, 303, 304, DIG. 11, 292/DIG. 63, 297; 312/111, 140, 263; 248/694
See application file for complete search history.

(56) References Cited

U.S. PATENT DOCUMENTS 637,160 A * 11/1899 Ritchter ...................... 84/177
1,825,595 A * 9/1931 Kohl ............................ 292/80
2,358,607 A * 9/1944 Tinnerman .................... 292/87
3,556,572 A * 1/1971 Olsson ......................... 292/87
3,748,006 A * 7/1973 Levit et al. .................. 312/111
4,023,877 A * 5/1977 Hennessey et al. .......... 439/329
4,023,878 A * 5/1977 Hennessey ................... 439/65
4,350,403 A * 9/1982 Seytre et al. ................ 439/325
4,725,921 A * 2/1988 Scholz ........................ 361/747
5,494,451 A * 2/1996 Bowers ....................... 439/328

* cited by examiner

Primary Examiner—Carlos Lugo
(74) Attorney, Agent, or Firm—Peter F. Corless; Steven M. Jensen; Edwards Angell Palmer & Dodge LLP

(57) ABSTRACT

A fastening mechanism for fixing a PCI bracket having a fixing piece in a casing is provided. The fastening mechanism includes a first mating member and a second mating member. The first mating member is fixed to the casing and includes a carrying piece for carrying the fixing piece and a fastening piece bending toward one end of the carrying piece. The second mating member includes a pressing piece for pressing the fixing piece, a first clipping piece bending toward one end of the pressing piece and pivotally connecting with the casing, and a second clipping piece bending toward another end of the pressing piece and corresponding in position to the fastening piece. The second mating member is rotated to combine with the first mating member, thereby securing the fixing piece in place horizontally and vertically.

9 Claims, 4 Drawing Sheets

FASTENING MECHANISM

FIELD OF THE INVENTION

The present invention relates to fastening mechanisms, and more particularly to a fastening mechanism which is applied on mounting a PCI bracket on a casing.

BACKGROUND OF THE INVENTION

To achieve certain functionalities, personal computers are usually connected to corresponding peripheral components. One mechanism for connecting a computer to a peripheral component is with a peripheral component interconnect (PCI) interface, which allows a motherboard of the computer to be connected to a PCI card. In a conventional method of fixing a PCI card, as depicted in FIG. 1, a known fixture assembly comprising a first fixing opening 10 for connecting with the casing 1 and a second fixing opening 120 disposed on a fixing piece 12 of the PCI bracket 11 are connected by using a screw 13 to secure the PCI bracket 11 within the casing 1. However, with the increase of the peripheral equipment, the number of the PCI cards installed also increases and thus the conventional method of using screws to fasten the PCI cards individually to the computer casing is inconvenient and also quite troublesome in dismantling in the case that the screws are damaged or inadvertently dropped in the chassis during installation, thus increasing a lot of labor cost for installation and maintenance and failing to satisfy the user's needs.

Taiwanese Invention Patent Certificate No. I223139 discloses a latch member for locking PCI cards in a computer chassis, in which the PCI card is connected to the latch member by a connecting board and the latch member is connected to the rack of the chassis having a connecting body that can be vertically pressed on the connecting board of the PCI card, and an elastic member that abuts against the rack of the chassis to allow the connecting board to be rotated at fixed angles.

Although such a latch member for securing the PCI bracket can eliminate the inconvenience of using a tool such as a screw, the PCI bracket holding multiple PCI cards has a weight that could impede the stability of PCI cards in the casing.

The stability of the PCI cards in the casing, and hence their reliability, depend on their firm installation. Any failure in this respect may affect the operation of the computer. What is needed is a fastening mechanism which facilitates attachment and/or detachment of a PCI bracket in a computer.

SUMMARY OF THE INVENTION

The present invention aims to eliminate the aforementioned drawbacks, and, as such, a primary objective of the present invention is to provide a fastening mechanism by which a PCI bracket can be mounted to a motherboard and within a computer chassis stably.

Another objective of the present invention is to provide a fastening mechanism that can fasten the PCI bracket to the casing without using a tool.

Another objective of the present invention is to provide a fastening mechanism that can shorten the time required for fixing a PCI bracket within the casing.

In order to achieve the above and other objectives, the present invention provides a fastening mechanism by which a PCI bracket can be mounted to a motherboard and within a casing, including a first mating member and a second mating member for fastening a PCI bracket having a fixing piece to a computer casing. The first mating member is fixed to the casing and comprises a carrying piece having the dimensions corresponding to the fixing piece to carry it, and a fastening piece bending from one end of the carrying piece. The second mating member comprises a pressing piece having the dimensions corresponding to the fixing piece, a first clipping piece bending from one end of the pressing piece and pivotally connecting with the casing, and a second clipping piece bending from another end of the pressing piece and having the mating position corresponding to the fastening piece. Whereby the carrying piece of the first mating is carried the fixing piece, and the second mating member is rotated to mate with the first mating member, the PCI bracket is fixed to the casing by securing the fixing piece in place horizontally and vertically.

Accordingly, an inverted U-shaped structure is constituted by connecting the first and second clipping piece of the second mating member with the pressing piece, thereby combining the second mating member with the first mating member to secure the fixing piece in place vertically and horizontally and improve the securing of PCI bracket in the casing.

In comparison with the conventional method of fixing a PCI bracket by a screw, the fastening mechanism is characterized in that the fixing piece attached to the PCI bracket is securely fixed between the first and second mating members, and the second mating member is pivotally connected in the computer chassis to thereby connect with the first mating member and fasten the PCI bracket to the casing without using a tool.

Moreover, the fastening mechanism is characterized in that the user can easily accomplish the process of the attachment and/or detachment of a PCI bracket in a casing without using a tool or any other latch mechanisms, thereby overcoming the known drawbacks of using various auxiliary tools that necessitate manpower, and thus the time and cost required for installation and maintenance, thus having high industrial applicability.

DETAILED DESCRIPTION OF THE PREFERRED EMBODIMENTS

The present invention is described in the following with specific embodiments, so that one skilled in the pertinent art can easily understand other advantages and effects of the present invention from the disclosure of the invention.

Figure 1:
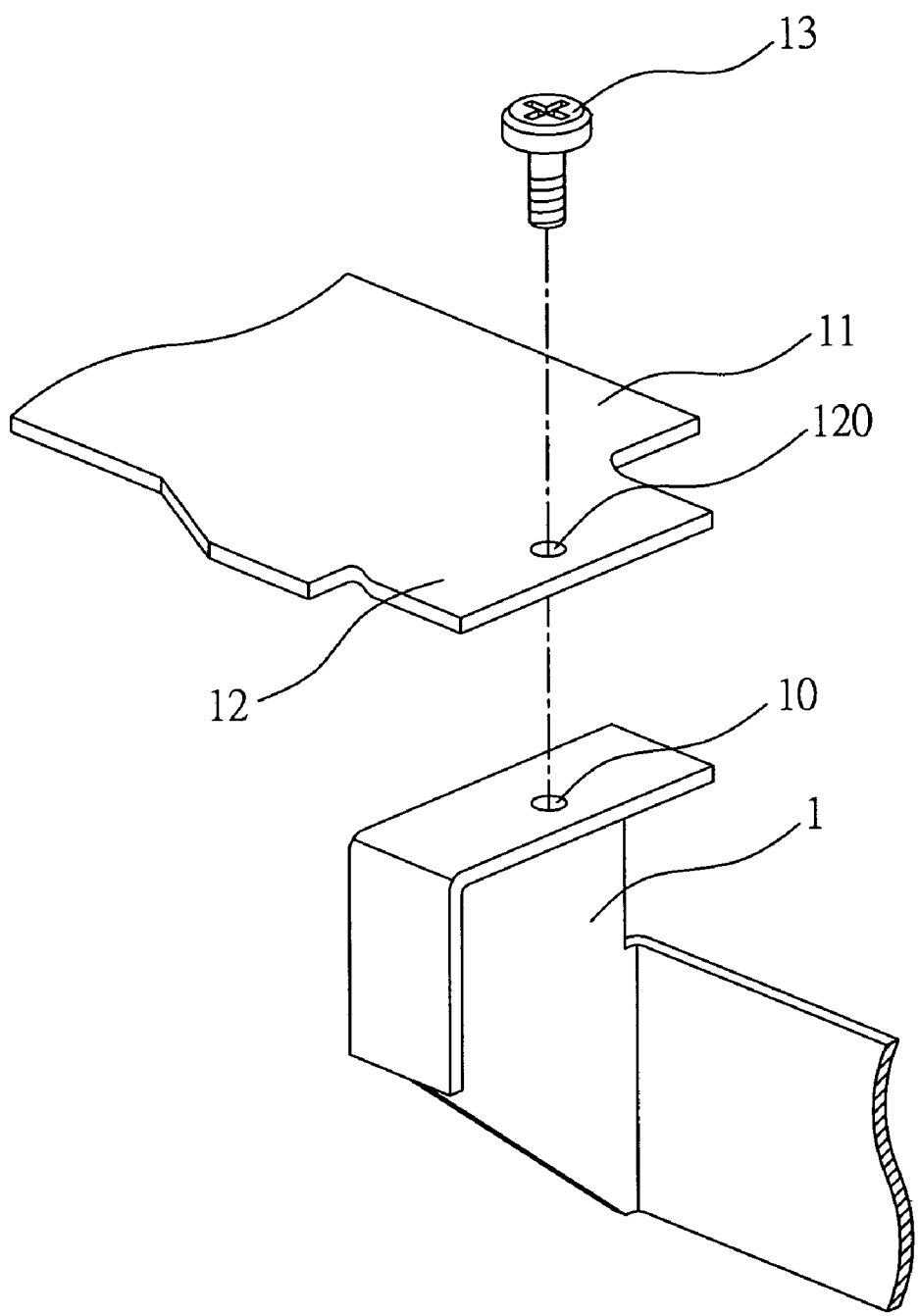
FIG. 1 shows a perspective view of a known fastening mechanism for fastening a PCI bracket in a casing.
Figure 2:
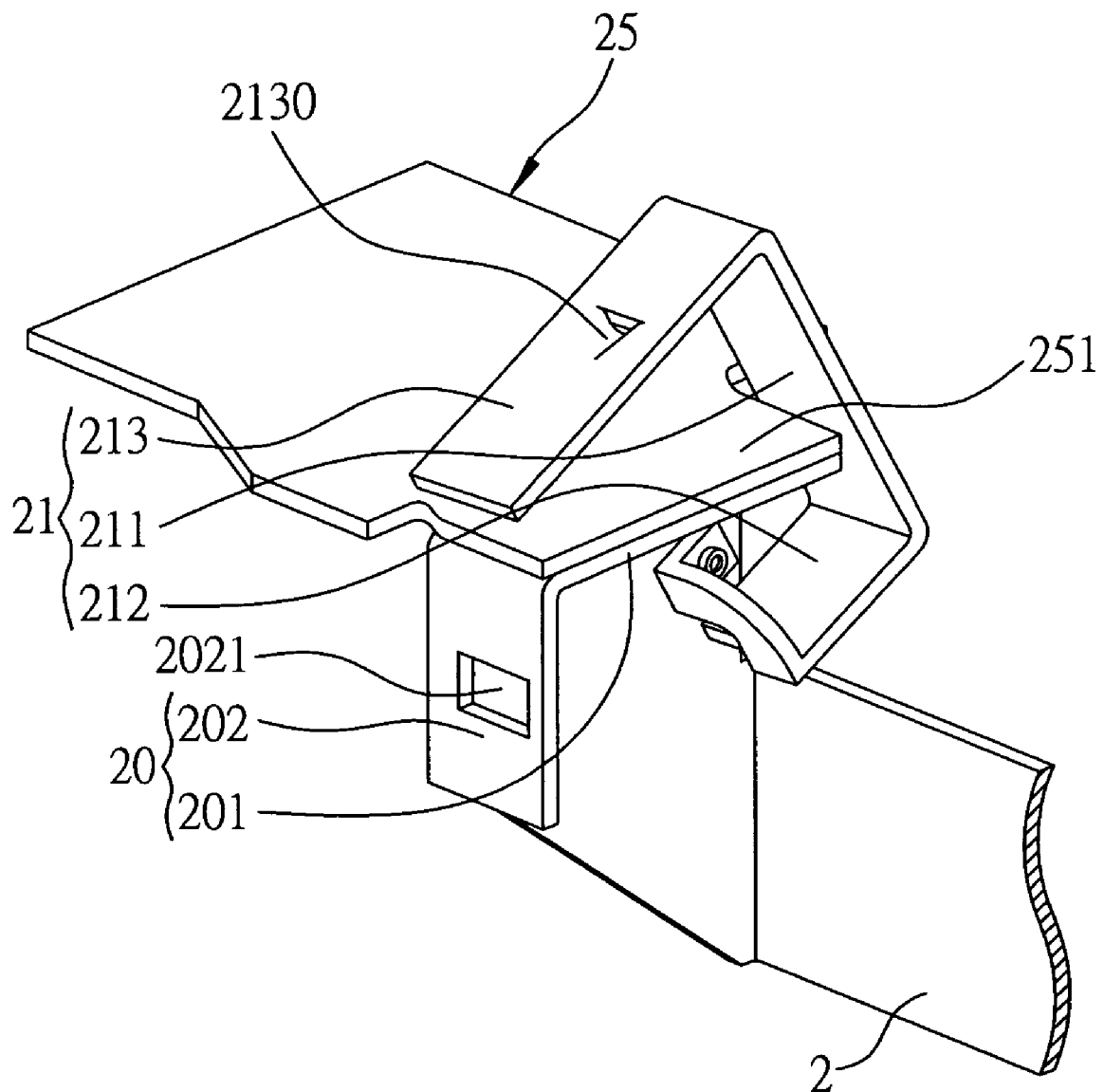
FIG. 2 shows a perspective view of the fastening mechanism not in a state of fastening a PCI bracket, in accordance with an embodiment of the invention.

As shown in FIG. 2, the fastening mechanism of the invention is used to fasten a PCI bracket 25 having a fixing piece 251 into a computer casing 2, comprising a first mating member 20 and a second mating member 21, wherein the first mating member 20 connects fixedly with the casing and has a carrying piece 201 for carrying the fixing piece 251 having the dimension corresponding fixing piece 251, and a fastening piece 202 vertically bending on one end of the carrying piece 201, and the second mating member 21 has a pressing piece 211 having the dimension corresponding to the fixing piece 251, a first clipping piece 212 vertically bending on end of the pressing piece 211 and connecting with the casing 2, and a second clipping piece 213 vertically bending on another end of the pressing piece 211 to correspond to the fastening piece 202.

The casing 2 may be the casing of a server unit, and the first mating member 20 is a fan fixing rack collectively disposed in the server casing (not shown) and the second mating member 21 is a metallic member having elasticity for mating with the first mating member 20.

Preferably, the fastening piece 202 vertically bends from the carrying piece 201 and the second clipping piece 213 of the second mating member 21 also vertically bends from the pressing piece 211 so as to tightly mate the second mating member 21 with the first mating member 20. Note that the bending angles of the first and second mating members 20, 21 are not limited to only in verticality as disclosed in this embodiment, it can be at any angle less than 90 degrees so long as the first and second mating members 20, 21 can be properly bent to securely couple with one another. In the case that the second mating member 21 is made of a material having good elasticity, the angles of bending the second mating member 212 from the pressing piece 211 and bending the fastening piece 202 from the carrying piece 201 can be less than 90 degrees to better fasten the second mating member 21 onto the first mating member 20.

The end of the first chipping piece 212 is connected to the casing 2 at a position under the carrying piece 201 of the first mating member 20. The first clipping piece 212 is dimensioned to be shorter than the second clipping piece 213 so as to avoid interference with one another while the second mating member 21 is rotated to couple with the first mating member 20, and the angle of bending the first clipping piece 212 from the pressing piece 211 can be equal to or more than 90 degrees.

Figure 3:
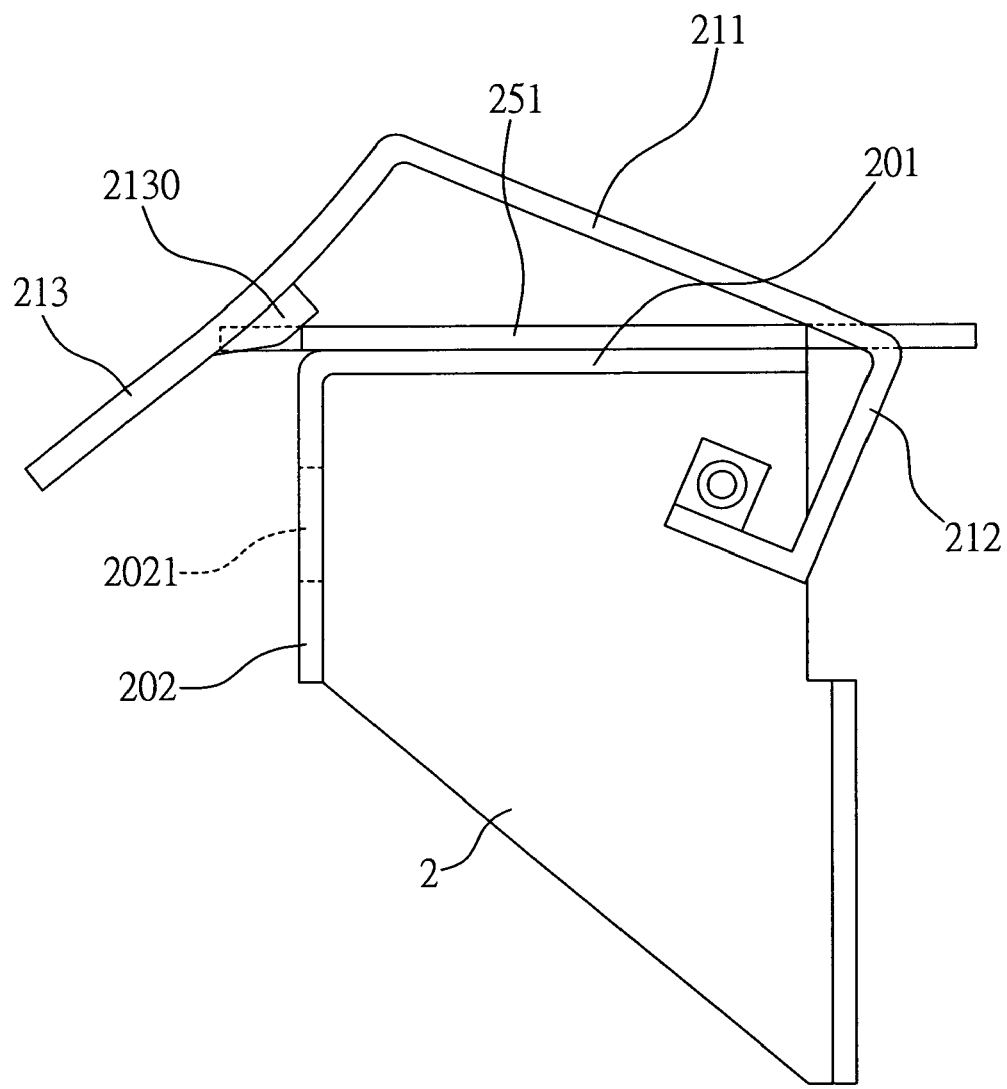
FIG. 3 shows a side view of the fastening mechanism in motion of fastening a PCI bracket, in accordance with an embodiment of the invention.
Figure 4:
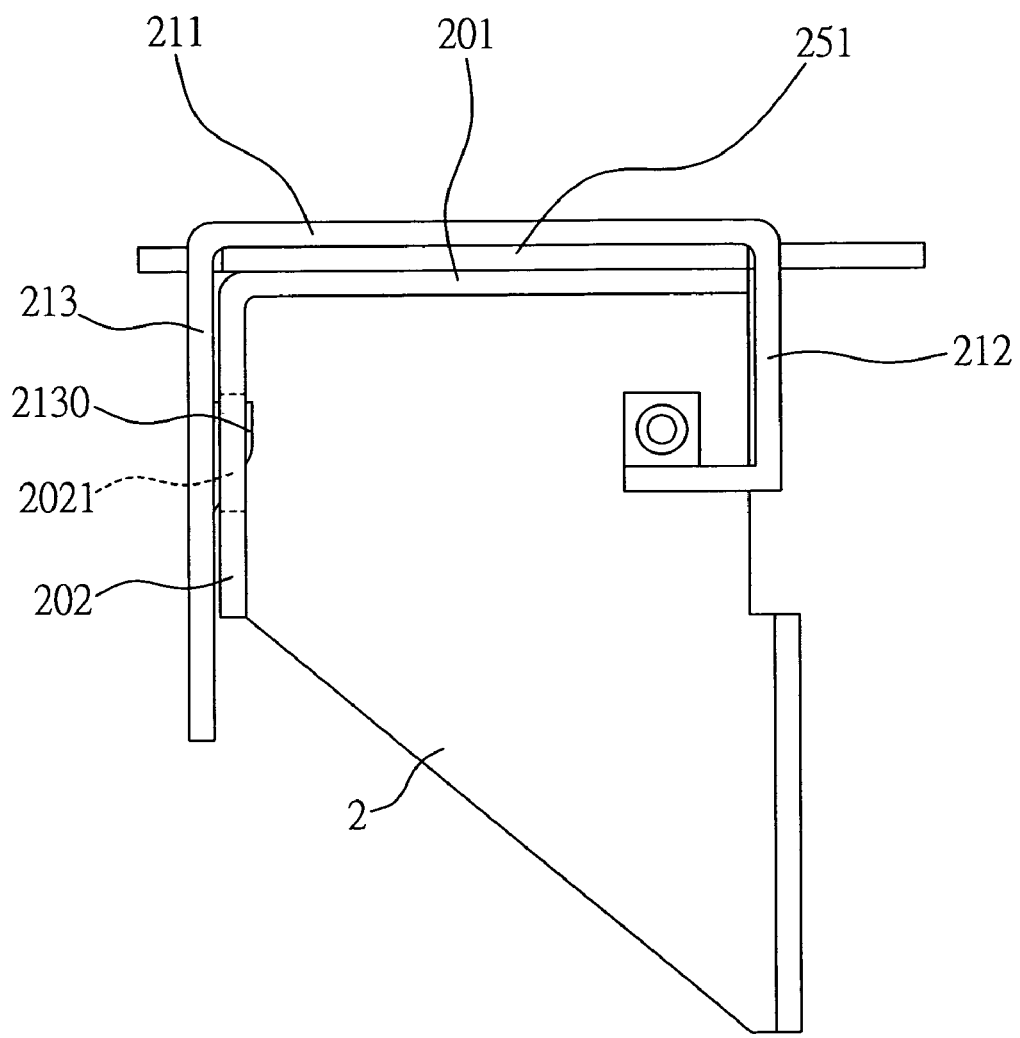
FIG. 4 shows a side view of the fastening mechanism in a state of fastening a PCI bracket, in accordance with an embodiment of the invention.

Referring to FIG. 2 to FIG. 4, as shown in FIG. 2, the fixing piece 251 attached to the PCI bracket 25 is placed on the carrying piece 201 of the first mating member 20, next as shown in FIG. 3, the second mating member 21 is rotated to allow the second clipping piece 213 to deform using the characteristic of an inherent elasticity until it abuts against a bending portion of the carrying piece 201 and fastening piece 202, lastly as shown in FIG. 4, when an approximate center of the second clipping piece 213 has passed the bending portion of the carrying piece 201 and the fastening piece 202, the second clipping piece 213 is tightly mated with the fastening piece 202, and concurrently, the pressing piece 211 presses on the fixing piece 251 while the first clipping piece 212 abuts against one end of the fixing piece 251 to allow the second mating member 21 to mate with the first mating member 20 and thereby install the PCI bracket 25 in the casing 2.

Furthermore, the fastening piece 202 of the first mating member 20 may include a first fastening portion 2021 such as a mating hole, and the second clipping piece 213 of the second mating member 21 may have a second fastening portion 2130 such as a wedge for correspondingly mating with the first fastening portion 2021 to reinforce the securing reliability of the second mating member 21 with the first mating member 20. Note that the structures of the first and second fastening portions 2021, 2130 can be switched as desired, that is, the first fastening portion 2021 may be a wedge whereas the second fastening portion 2130 is a mating hole intended for mating with the wedge.

In summary, the second mating member 21 of the invention is an inverted U-shaped structure constituted by connecting the first and second clipping pieces 212, 213 with the pressing piece 211, thereby combining the inverted U-shaped second mating member 21 with the first mating member 20 of an L shape to secure the fixing piece 251 in place in both vertical and horizontal direction and improve the securing of PCI bracket in prior techniques.

Also, compared with the conventional method to install a PCI bracket by screws, the fastening mechanism of the invention is characterized in that the fixing piece attached to the PCI bracket is securely fixed between the first and second mating members, and the second mating member is pivotally connected in the computer chassis to thereby connect with the first mating member and fasten the PCI bracket within the casing without using a tool.

Moreover, the fastening mechanism of the invention allows the user to easily complete the process of the attachment and/or detachment of a PCI bracket in a computer without having to use a tool or any other fastening mechanisms, thereby overcoming the drawbacks of using various auxiliary tools that necessitate manpower, the time and cost required for installation and maintenance. The present invention offers advantages over the prior art and thus has high industrial applicability.

The foregoing description of the embodiments of the invention has been presented for the purposes of illustration and description. It is not intended to be exhaustive or to limit the invention to the precise forms disclosed. Persons skilled in the relevant art can appreciate that many modifications and variations are possible in light of the above teaching. It is therefore intended that the scope of the invention be limited not by this detailed description, but rather by the claims appended hereto.

What is claimed is:

1. A fastening mechanism adapted for fixing a bracket to a casing, the bracket having a fixing piece, the fastening mechanism comprising:

a first mating member fixed to the casing, the first mating member having a carrying piece for carrying the fixing piece, and a fastening piece bending from one end of the carrying piece; and a second mating member for mating with the first mating member, the second mating member comprising a pressing piece for pressing the fixing piece, a first clipping piece bending from one end of the pressing piece and pivotally connected with the casing, and a second clipping piece bending from another end of the pressing piece for mating with the fastening piece;

wherein the fixing piece of the bracket is positioned over the carrying piece of the first mating member, and the second mating member is then pivoted over the fixing piece, such that the second clipping piece mates with the fastening piece and the pressing piece presses against the fixing piece so as to fix in place the bracket against the casing.

2. The fastening mechanism of claim 1, wherein the fastening piece has a first fastening portion, and the second clipping piece of the second mating member has a second fastening portion corresponding to the first fastening portion of the fastening piece.

3. The fastening mechanism of claim 2, wherein the first fastening portion is a mating hole, and the second fasting portion is a wedge for correspondingly mating with the mating hole.

4. The fastening mechanism of claim 2, wherein the first fastening portion is a wedge, and the second fasting portion is a mating hole for correspondingly mating with the wedge.

5. The fastening mechanism of claim 1, wherein the end of the first clipping piece is pivotally connected to the casing at a position under the carrying piece.

6. The fastening mechanism of claim 1, wherein the first clipping piece is shorter than the second clipping piece.

7. The fastening mechanism of claim 1, wherein the second clipping piece and the pressing piece have an included angle corresponding to another included angle between the fastening piece and the carrying piece.

8. The fastening mechanism of claim 1, wherein the casing is a housing of a server computer, and the first mating member is a fan fixing rack connected to the housing of the server computer.

9. The fastening mechanism of claim 1, wherein the second mating member is a metallic member having elasticity.

* * * * *